United States Patent
Kim

(10) Patent No.: US 8,400,655 B2
(45) Date of Patent: Mar. 19, 2013

(54) IMAGE PROCESSING METHOD, IMAGE FORMING APPARATUS AND HOST APPARATUS THEREOF

(75) Inventor: Young-Ju Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1103 days.

(21) Appl. No.: 12/266,938

(22) Filed: Nov. 7, 2008

(65) Prior Publication Data

US 2009/0122328 A1    May 14, 2009

(30) Foreign Application Priority Data

Nov. 9, 2007  (KR) .................. 10-2007-0114576

(51) Int. Cl.
*G06F 15/00*  (2006.01)

(52) U.S. Cl. ....................... 358/1.15; 358/1.9

(58) Field of Classification Search .......... 358/1.15, 358/1.9, 1.1, 518, 3.24, 523; 382/167, 162; 345/589, 604
See application file for complete search history.

(56) References Cited

U.S. PATENT DOCUMENTS

| | | |
|---|---|---|
| 7,245,389 B2 | 7/2007 | Dougherty et al. |
| 2004/0145763 A1* | 7/2004 | Dougherty et al. .......... 358/1.13 |
| 2008/0123948 A1* | 5/2008 | De Baer ................. 382/167 |

FOREIGN PATENT DOCUMENTS

| | | |
|---|---|---|
| JP | 08-251412 | 9/1996 |
| JP | 11-259266 | 9/1999 |
| JP | 2003-51902 | 2/2003 |
| JP | 2003-125222 | 4/2003 |
| JP | 2007-104492 | 4/2007 |
| KR | 10-0667818 | 1/2007 |

OTHER PUBLICATIONS

Chinese Office Action dated Jan. 6, 2012 issued in corresponding Chinese Patent Application No. 200810172106.4.
Korean Office Action issued Jun. 21, 2012 in corresponding Korean Patent Application No. 10-2007-0114576.
Second Chinese Office Action issued Sep. 11, 2012 in corresponding Chinese Patent Application No. 200810172106.4.

* cited by examiner

*Primary Examiner* — Saeid Ebrahimi Dehkordy
(74) *Attorney, Agent, or Firm* — Staas & Halsey LLP

(57) ABSTRACT

An image processing method includes measuring a state of an image forming apparatus which is connected to a host apparatus to perform color and mono printings; selecting at least one of a plurality of color management system profiles by using the measured state of the image forming apparatus; and generating a printing data of a document based on the selected color management system profile.

22 Claims, 6 Drawing Sheets

IMAGE PROCESSING METHOD, IMAGE FORMING APPARATUS AND HOST APPARATUS THEREOF

CROSS-REFERENCE TO RELATED APPLICATION

This application claims the benefit of Korean Patent Application No. 2007-114576, filed in the Korean Intellectual Property Office on Nov. 9, 2007, the disclosure of which is incorporated herein by reference.

BACKGROUND OF THE INVENTION

1. Field of the Invention

Aspects of the present invention relate to an image processing method, an image forming apparatus and a host apparatus thereof, and more particularly, to an image processing method, an image forming apparatus and a host apparatus thereof generating a printing data of a document optimized to various printing environments.

2. Description of the Related Art

An image forming apparatus, such as a printer, an electric copier, a facsimile machine, or a multifunction device, receives printing data of a document from a host apparatus (such as a computer), and forms an image on a printable medium based on the received printing data. The host apparatus of the image forming apparatus generates the printing data of the document so that the image forming apparatus can properly perform the printing.

The document to be printed by the image forming apparatus may be obtained from various sources, such as a monitor, a scanner, or a digital camera. However, since these apparatuses and the image forming apparatus have different color representation types, an appropriate color conversion or a color matching is necessary to generate the printing data of the document obtained from these apparatuses.

For the appropriate color conversion or the color matching, a profile of a color management system (hereinafter referred to 'CMS profile') previously provided may be used. The host apparatus of the image forming apparatus refers to the CMS profile to appropriately generate the printing data of the document obtained from the various apparatuses to be in accord with the color representation type of the image forming apparatus.

A conventional host apparatus of an image forming apparatus uses a fixed CMS profile. Once the CMS profile corresponding to a model of the image forming apparatus which is to print the document is determined, the determined CMS profile is usually used continually thereafter. However, if the fixed CMS profile is used, it is difficult to perform the printing appropriately to various printing environments. For example, in case of a printing environment such as temperature, the fixed CMS profile fails to appropriately correspond to a seasonal temperature variation, and print quality deteriorates in winter or summer. In addition, with respect to factors such as a use history of the image forming apparatus or the type of the document, etc., just using the fixed profile is insufficient to obtain optimum printing quality.

SUMMARY OF THE INVENTION

Aspects of the present invention provide an image processing method, an image forming apparatus and a host apparatus thereof generating a printing data optimized to various printing environments, etc., thereby improving a printing quality.

According to an aspect of the present invention, an image processing method is provided. The method comprises measuring a state of an image forming apparatus connected to a host apparatus to perform color and mono printings; selecting at least one of a plurality of color management system profiles based on the measured state of the image forming apparatus; and generating printing data of a document based on the selected color management system profile.

According to another aspect of the present invention, the measuring of the state of the image forming apparatus is initiated by the image forming apparatus or by the host apparatus.

According to another aspect of the present invention, the measuring of the state of the image forming apparatus is performed when a printing command to print the document is issued, when a user interface with respect to the image forming apparatus is displayed, when the image forming apparatus is turned on, and/or when a power saving mode of the image forming apparatus is cancelled; or the measuring of the state of the image forming apparatus is performed periodically or randomly.

According to another aspect of the present invention, the image processing method further comprises displaying the measured state of the image forming apparatus and/or the selected color management system profile.

According to another aspect of the present invention, the displaying is selectively performed based on whether the measuring of the state of the image forming apparatus is initiated by the image forming apparatus or by the host apparatus.

According to another aspect of the present invention, the displaying comprises using a user interface of a printer driver corresponding to the image forming apparatus and/or a menu of an operation panel of the image forming apparatus.

According to another aspect of the present invention, the measured state of the image forming apparatus is changeable by a user.

According to another aspect of the present invention, the state of the image forming apparatus comprises at least one of an inner temperature, an outer temperature, moisture and a use history of the image forming apparatus, a type of the document, and a type and a size of a printable medium.

According to another aspect of the present invention, the type of the document comprises at least one of a text gray, a graphic gray, a graphic, a photo, and a text.

According to another aspect of the present invention, one of a 1-dimension and a 3-dimension may be applied depending on the type of the document.

According to another aspect of the present invention, the color management system profile is stored in at least one of the image forming apparatus, the host apparatus, and an external storing apparatus connected to one of the image forming apparatus and the host apparatus.

According to another aspect of the present invention, the external storing apparatus comprises at least one of a universal serial bus memory and a server connected via a network.

According to another aspect of the present invention, a host apparatus of an image forming apparatus which performs color and monochrome printing is provided. The host apparatus comprises a communicating unit to communicate with the image forming apparatus; an image processing unit to generate printing data of a document to be printed by the image forming apparatus; and a control unit to select at least one of a plurality of color management system profiles based on a state of the image forming apparatus, and to control the image processing unit to generate the printing data of the document based on the selected at least one color management system profile.

According to another aspect of the present invention, one of the image forming apparatus and the host apparatus may initiate a command to measure the state of the image forming apparatus.

According to another aspect of the present invention, the host apparatus of the image forming apparatus further comprises a display unit, wherein the control unit controls the display unit to display at least one of the state of the image forming apparatus and the selected color management system profile.

According to another aspect of the present invention, the control unit controls the display unit to display selectively according to whether the measuring the state of the image forming apparatus is initiated by the image forming apparatus or by the host apparatus.

According to another aspect of the present invention, the control unit uses at least one of a user interface of a printer driver which corresponds to the image forming apparatus, and a menu of an operation panel of the image forming apparatus.

According to another aspect of the present invention, n image forming apparatus which performs color and monochrome printing is provided. The image forming apparatus comprises an image processing unit to generate printing data of a document; an image forming unit to perform printing based on the printing data; a state measuring unit to measure a state of the image forming apparatus; and a control unit to select at least one of a plurality of color management system profiles based on the measured state of the image forming apparatus, and to control the image processing unit to generate the printing data of the document based on the selected color management system profile.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
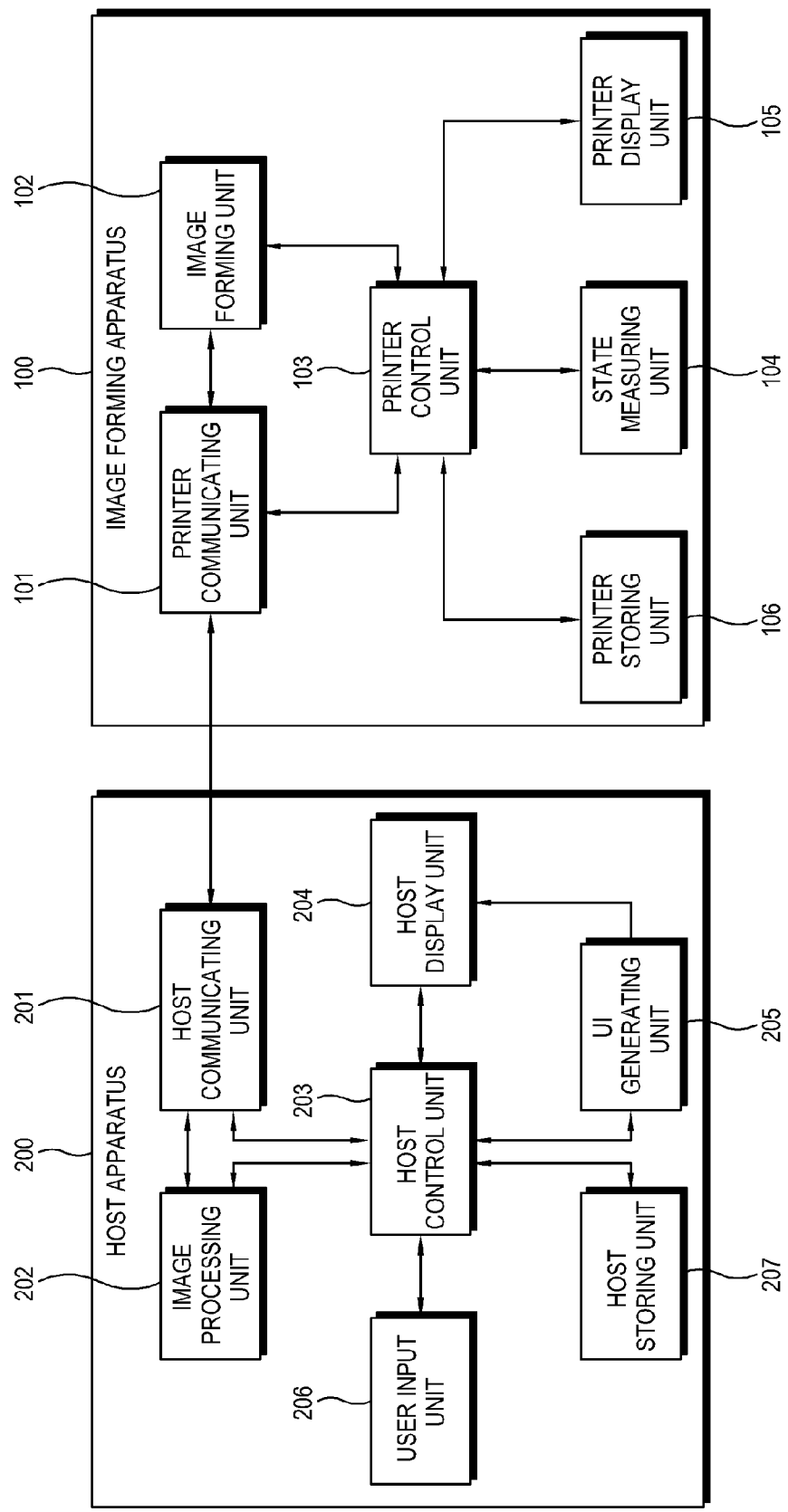
FIG. 1 is a block diagram of an image forming apparatus and a host apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an image forming apparatus 100 and a host apparatus 200 according to an embodiment of the present invention. The image forming apparatus 100 may be, for example, a printer, a copier, a facsimile machine, or a multi-function device, and forms an image onto a printable medium based on printing data. The printable medium may be, for example, paper, film, transparency, or thermal paper. The host apparatus 200 may be provided as a computer, and is connected to the image forming apparatus 100 to generate the printing data of a document to be printed, and to supply the printing data to the image forming apparatus 100.

The image forming apparatus 100 is capable of performing color and mono printings, and the printing type thereof includes an electrophotographic type. The document to be printed using the image forming apparatus 100 may be text, graphics, a photo, etc., and includes object and image files.

According to an embodiment of the present invention, a plurality of CMS profiles is provided to correspond to various printing environments (hereinafter referred to as 'state of the image forming apparatus 100'). The state of the image forming apparatus 100 includes at least one (hereinafter referred to as 'factor') of an inner temperature, an outer temperature and moisture of the image forming apparatus 100, a use history of the image forming apparatus 100, the type of a document, and the type and size of a record medium. The state of the image forming apparatus 100 may take into account one or more of these factors or additional factors. The use history of the image forming apparatus 100 includes a dot count amount, a toner consumption amount, and a total page count amount. The plurality of CMS profiles may be obtained by experimentally accumulating printing results of the image forming apparatus 100 under each printing environment. The CMS profiles may be stored in a file type, or a lookup table (LUT) type.

The host apparatus 200 measures the state of the image forming apparatus 100, selects at least one of the plurality of CMS profiles using the measured state of the image forming apparatus 100, and generates printing data of a document based on the selected CMS profile. Accordingly, compared with the conventional case in which only a fixed CMS file is used, an improved printing quality can be obtained by generating the printing data optimized to the printing environment.

Hereinafter, the configurations of the image forming apparatus 100 and the host apparatus 200 are described in more detail. As shown in FIG. 1, the image forming apparatus 100 includes a printer communicating unit 101, an image forming unit 102, and a printer control unit 103. The host apparatus 200 includes a host communicating unit 201, an image processing unit 202 and a host control unit 203. According to other aspects of the present invention, the image forming apparatus 100 or the host apparatus 200 may contain additional and/or different units. Similarly, the functionality of two or more of the above units may be integrated into a single component.

The printer communicating unit 101 and the host communicating unit 201 communicate with each other, and transmit the printing data of the document from the host apparatus 200 to the image forming apparatus 100. The printer communicating unit 101 and the host communicating unit 201 may perform the communication using a wired or a wireless communication technology.

The image processing unit 202 generates the printing data of the document to be printed depending on a control of the host control unit 203. The image forming unit 102 forms an image onto the printable medium based on the printing data processed by the image processing unit 202, and received via the printer communicating unit 101.

The host control unit 203 and the printer control unit 103 respectively control the host apparatus 200 and the image forming apparatus 100. The host control unit 203 controls the image forming unit 202 to generate the printing data of the document to be printed, and controls the host communicating unit 201 to transmit the generated printing data together with a printing order to the image forming apparatus 100. If the print command is transmitted from the host apparatus 200 through the printer communicating unit 101, the printer control unit 103 controls the image forming unit 102 to perform the printing based on the transmitted printing data.

In generating the printing data, the host control unit 203 measures the state of the image forming apparatus 100, and selects at least one of a plurality of previously provided CMS profiles corresponding to the measured state of the image forming apparatus 100. The host control unit 203 controls the image processing unit 202 to compensate an original printing data of the document based on the selected CMS profile.

The image forming apparatus 100 may further include a state measuring unit 104 measuring the state of the image forming apparatus 100. The state measuring unit 104 includes at least one of a moisture sensor, a dot counter, a toner consumption measuring sensor, a page counter and a printable medium discriminating sensor (not shown) to correspond to the state of the image forming apparatus 100.

The type of the document may be confirmed by the host control unit 203 of the host apparatus 200. The type of the document may includes a text gray, a graphic gray, a graphic, a photo and a text as the type of an object included to the document. Among these, the text gray and the graphic gray may be classified into a 1-dimension (monochrome), and the graphic, the photo, and the text may be classified into a 3-dimension (color).

The measuring of the state of the image forming apparatus 100 may be started by the image forming apparatus 100 or by the host apparatus 200. If the measuring of the state of the image forming apparatus 100 is started by the image forming apparatus 100, the image forming apparatus 100 actively performs the measuring of the state (hereinafter referred to as 'two-way'). On the other hand, if the measuring of the state of the image forming apparatus 100 is started by the host apparatus 200, the image forming apparatus 100 passively performs the measuring of the state by a demand of the host apparatus 200 (hereinafter referred to as 'one-way').

A starting point of the measuring of the state of the image forming apparatus 100 may be when the printing command for the document is issued, when a user interface of a printer driver corresponding to the image forming apparatus 100 is displayed, when the image forming apparatus 100 is turned on, and/or when a power saving mode of the image forming apparatus 100 is cancelled. The state of the image forming apparatus 100 may be periodically measured or randomly measured. Information about the state of the image forming apparatus 100 obtained by the measuring may be transmitted from the image forming apparatus 100 to the host apparatus 200 through the printer communicating unit 101 and the host communicating unit 201.

The host apparatus 200 further includes a host display unit 204. The host control unit 203 may control the host display unit 204 to display at the measured state of the image forming apparatus 100 and/or the selected CMS profile. The host display unit 204 may be provided as a monitor for a computer. Alternatively, the image forming apparatus 100 may also include a printer display unit 105 such as an operation panel to display at least one of the measured state of the image forming apparatus 100 and the selected CMS profile.

Figure 2:
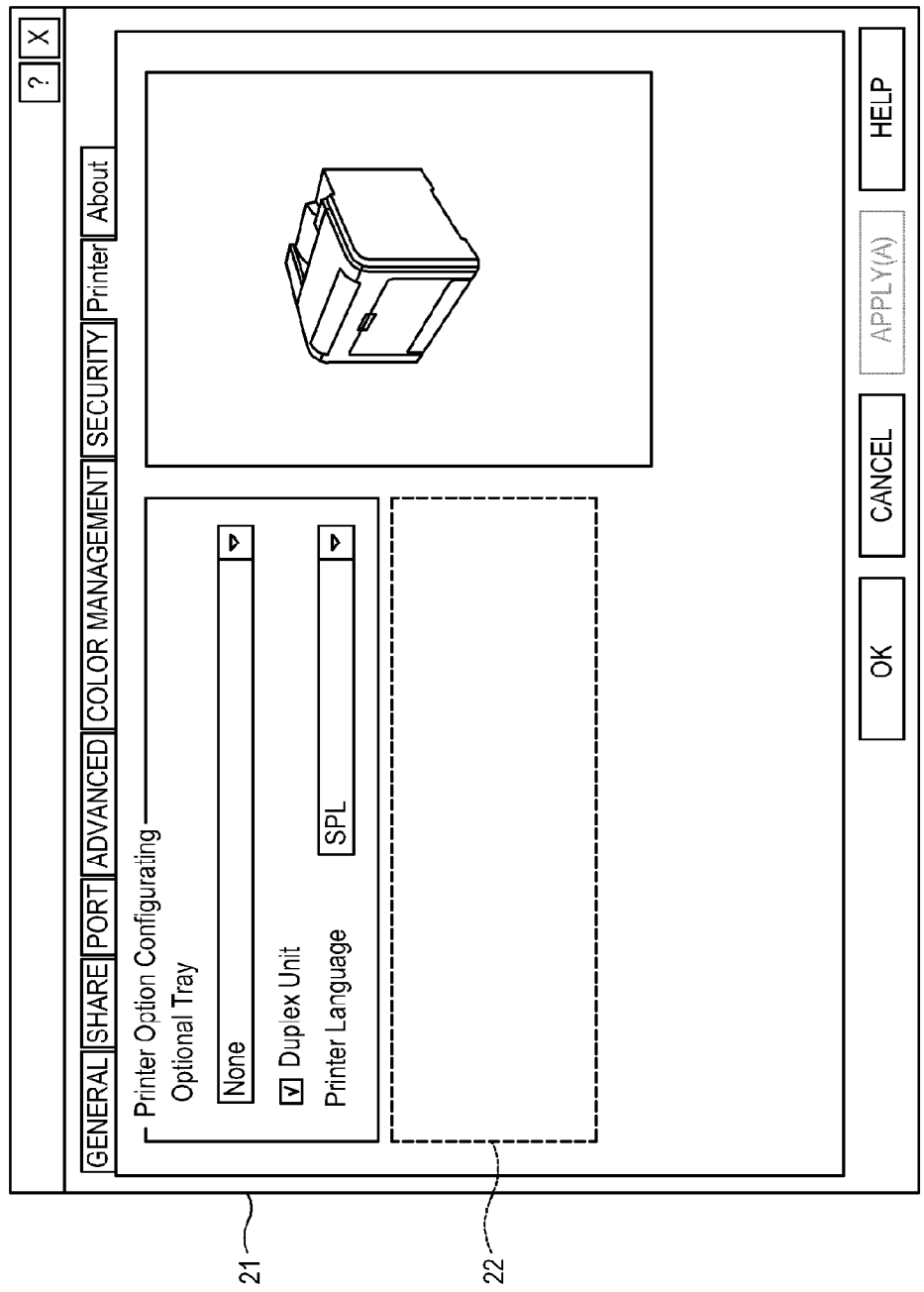
FIGS. 2 and 3 illustrate examples of a user interface in which the state of the image forming apparatus shown in FIG. 1 is selectively displayed.
Figure 3:
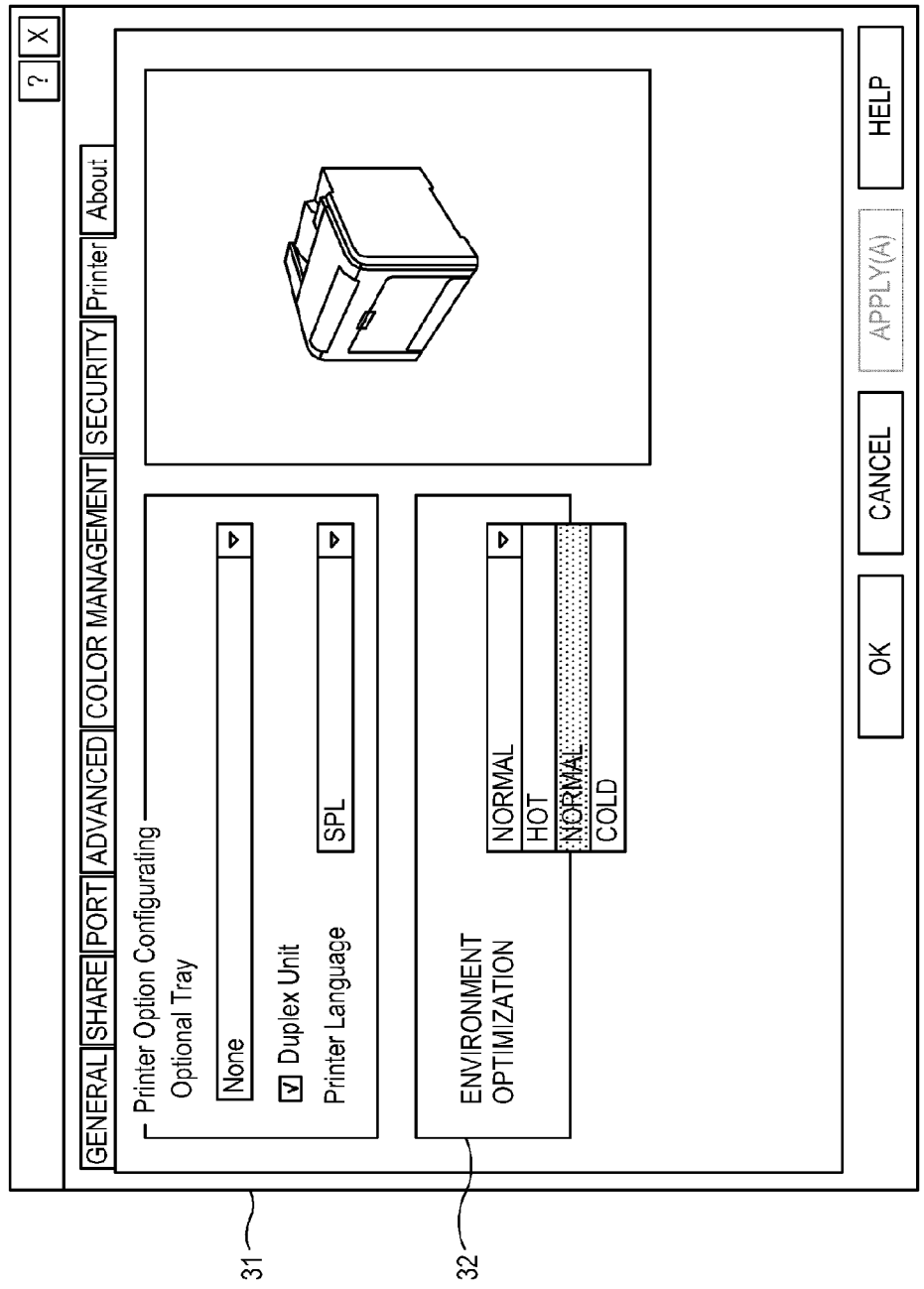

The measured state of the image forming apparatus 100 and/or the selected CMS profile may be displayed through the user interface of the printer driver corresponding to the image forming apparatus 100 or through a menu of the operation panel of the image forming apparatus 100. FIGS. 2 and 3 show examples of a user interface 21 and 31 in which the state of the image forming apparatus 100 is selectively displayed. As shown in FIG. 3, the state of the image forming apparatus 100 is temperature (referring to "hot", "normal" and "cold" in FIG. 3).

Figure 4:
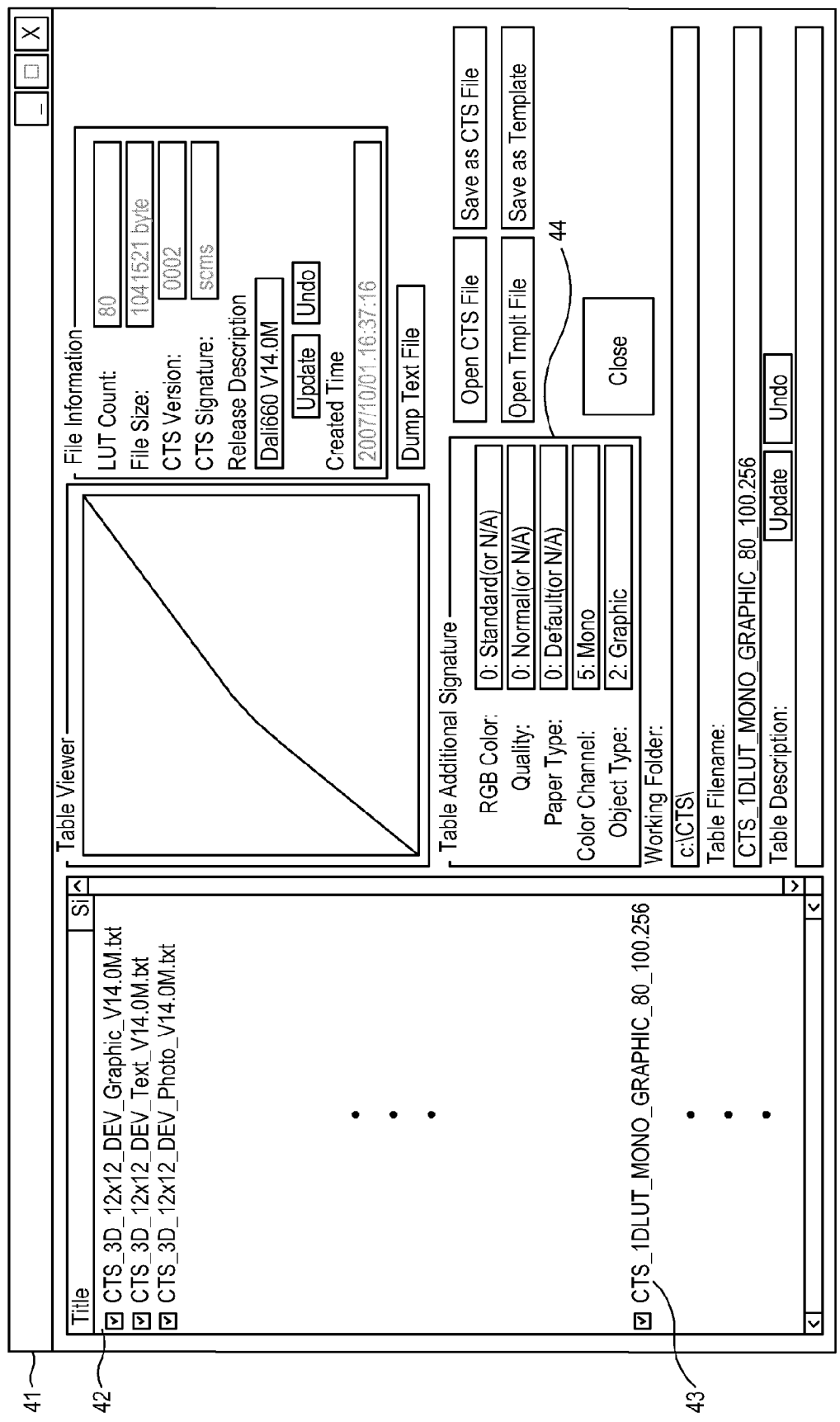
FIGS. 4 and 5 illustrate examples of a user interface in which a CMS profile selected by the image forming apparatus shown in FIG. 1 is displayed.
Figure 5:
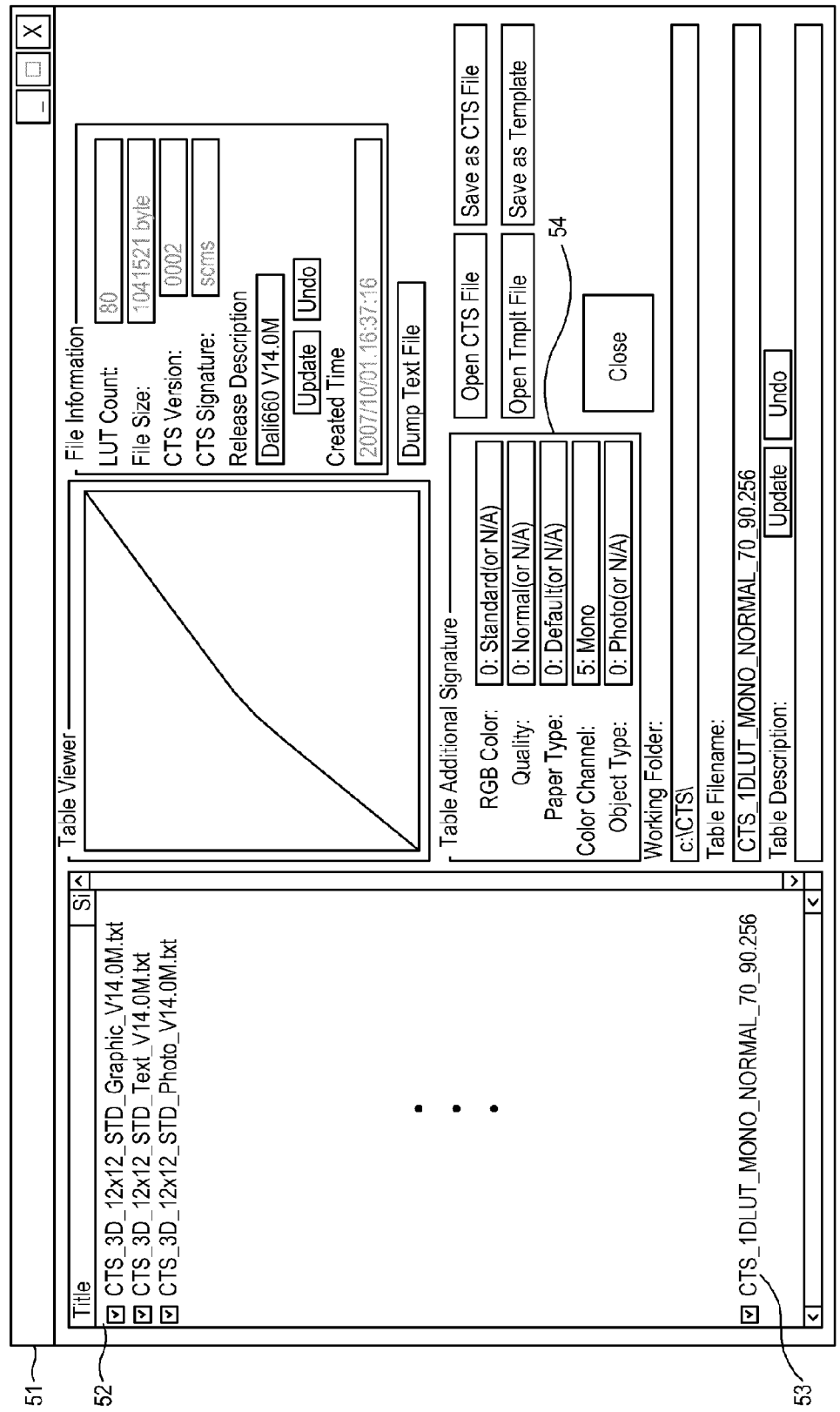

Alternatively, FIGS. 4 and 5 show examples of user interfaces 41 and 51 in which the selected CMS profile is displayed. As shown in FIGS. 4 and 5, the state of the image forming apparatus 100 is the type of a document. In FIGS. 4 and 5, reference numerals 42 and 52 refer to names of the CMS profile corresponding to the type of the document, and reference numerals 43 and 53 refer to the CMS profile currently selected. As shown in FIGS. 4 and 5, information about the selected CMS profile 44 and 54 may be displayed in the user interfaces 41 and 51. The host apparatus 200 may further include a UI (user interface) generating unit 205 generating the user interfaces 21 to 51 depending on a control of the host control unit 203.

The host control unit 203 or the printer control unit 103 may selectively display the state of the image forming apparatus 100 and/or the CMS profile according to the two-way measuring or the one-way measuring. For the two-way measuring, the state of the image forming apparatus 100 may be displayed (referring to 32 in FIG. 3) or not displayed (referring to 22 in FIG. 2) in the user interfaces 21 and 31. The one-way measuring is similar to the two-way measuring. It may be previously determined in which case the state of the image forming apparatus 100 is displayed in the user interfaces 21 and 31.

The host apparatus 200 may further include a user input unit 206 receiving an input of a user, such as a mouse, a keyboard, a touchpad, a microphone, or other device capable of receiving input from the user. The host control unit 203 may change the previously measured state of the image forming apparatus 100 depending on the input of the user received via the user input unit 206. The user is capable of directly determining the state of the image forming apparatus 100 through the user input unit 206. Referring to FIG. 3, in changing the state of the image forming apparatus 100 by the user, the user interface 31 may be used. If the previously measured state of the image forming apparatus 100 is changed by the user, the CMS profile corresponding to the changed state of the image forming apparatus 100 may be selected.

At least one of the image forming apparatus 100 and the host apparatus 200 may further include a printer storing unit 106 and/or a host storing unit 207 storing a plurality of CMS profiles. Alternatively, the plurality of CMS profiles may be stored in an external storing apparatus (not shown) connected to at least one of the image forming apparatus 100 and the host apparatus 200. The external storing apparatus may be provided as a universal serial bus memory (not shown), a memory card (not shown), a server (not shown) connected by means of a network, etc.

The printer control unit 103 may include a nonvolatile memory (not shown) such as a read only memory (ROM) in which a computer program is stored, a volatile memory (not shown) such as a random access memory (RAM) for loading the computer program stored in the nonvolatile memory, and a processor (not shown) such as a central processing unit (CPU) executing the computer program loaded in the volatile memory. The image processing unit 202 and the host control unit 203 may include a nonvolatile memory, a volatile memory and a processor like the printer control unit 103. The printer control unit 103 and the host control unit 203 are respectively examples of the control unit of the image forming apparatus and the control unit of the host apparatus.

Figure 6:
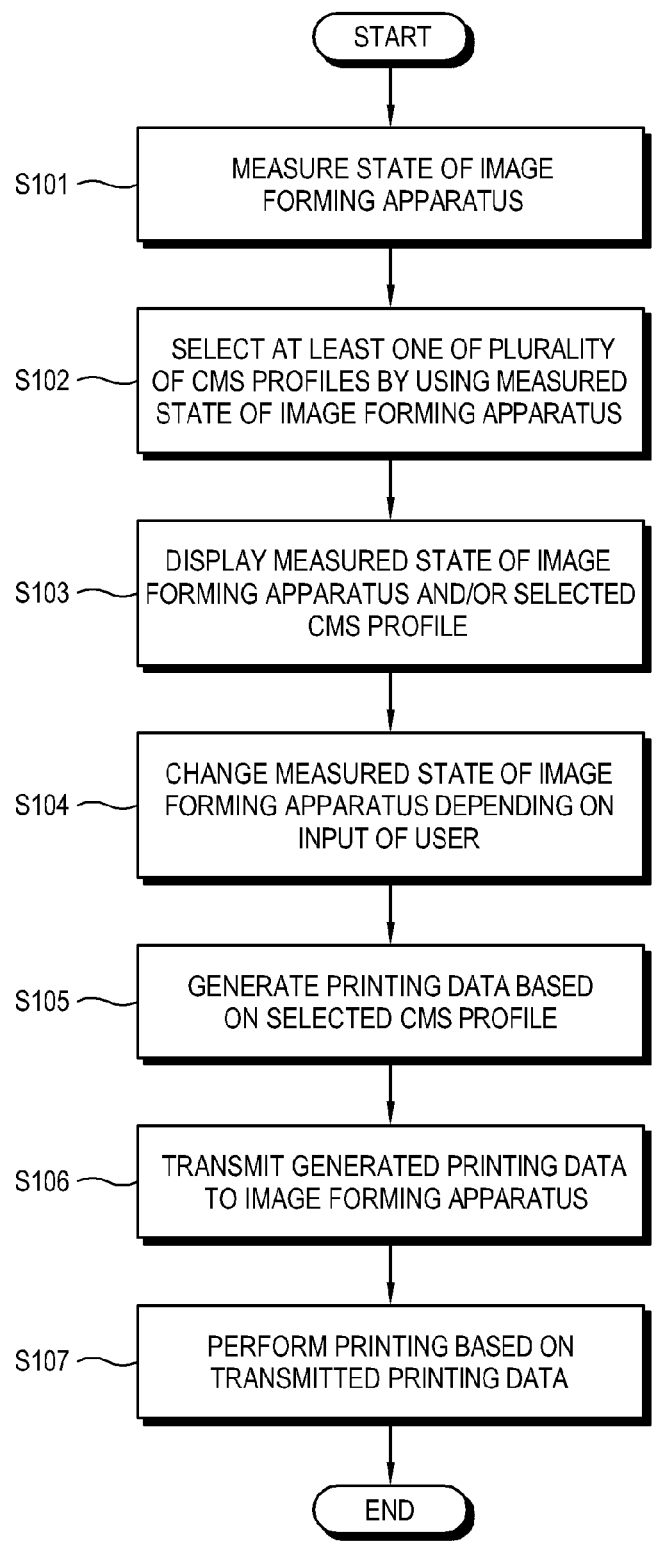
FIG. 6 is a flowchart illustrating an image processing method using the image forming apparatus and the host apparatus shown in FIG. 1.

FIG. 6 is a flowchart of an image processing method using the image forming apparatus 100 and the host apparatus 200 according to an embodiment of the present invention. In describing the image processing method, the description of the image forming apparatus 100 and the host apparatus 200 is omitted for a convenient description.

In operation S101, the state of the image forming apparatus 100 is measured. Operation S101 may be initiated by either the image forming apparatus 100 or the host apparatus 200. If information about the state of the image forming apparatus 100 is obtained in the image forming apparatus 100, an operation of transmitting the obtained information about the state of the image forming apparatus 100 from the image forming apparatus 100 to the host apparatus 200 may be added.

In operation S102, at least one of a plurality of CMS profiles is selected using the measured state of the image forming apparatus 100. The factor about the measured state of the image forming apparatus 100 may be variously determined. A single factor may be used, or more than two factors may be concurrently used.

If more than two factors are concurrently used, a CMS profile corresponding to a combination of the more than two factors may be selected. For example, the more than two factors may be a combination of an outer temperature and an inner temperature of the image forming apparatus 100, or a combination of the temperature of the image forming apparatus 100 and a use history of the image forming apparatus 100.

The following Table 1 represents an example of the plurality of CMS profiles corresponding to the mixture of the inner temperature and the outer temperature of the image forming apparatus 100.

In Table 1, the outer ADC value and the inner ADC value are respectively digital values converted from measured analog values of the outer temperature and the inner temperature. As shown in Table 1, the plurality of CMS profiles are classified into three cases (low, normal and high) depending on the combination of the outer temperature and the inner temperature. If the combination of the outer temperature and the inner temperature measured in operation S101 corresponds to one of the three cases in Table 1, a corresponding CMS profile may be selected.

Alternatively, the following Table 2 represents the plurality of CMS profiles corresponding to the combination of the temperature of the image forming apparatus 100 and the use history of the image forming apparatus 100.

TABLE 2

| | use history (thousand sheets) | | | | | | | | | | | | | | |
|---|---|---|---|---|---|---|---|---|---|---|---|---|---|---|---|
| | 10 | 50 | 100 | 150 | 200 | 250 | 300 | 350 | 400 | 450 | 500 | 550 | 600 | 650 | 700 |
| 1 | CMS profile 1 (low, normal and high) | | | | | | | | | | | | | | |
| 2 | | | | | | | CMS profile 2 (low, normal and high) | | | | | | | | |
| 3 | | | | | | | | | | | | | CMS profile 3 (low, normal and high) | | |

The CMS profiles 1 to 3 in Table 2 may be provided to respectively correspond to the low, normal and high temperatures one by one. As shown in Table 2, after a corresponding one of the CMS profiles 1 to 3 is selected according to the use history of the image forming apparatus 100, for example, the total page consumption amount, one of the selected CMS profile corresponding to the temperature of the image forming apparatus 100 is used. Alternatively, as the use history of the image forming apparatus 100, a factor such as the dot count amount, the toner consumption amount, etc., may be applied as in Table 2 in addition to the total page consumption amount.

Referring to FIG. 6, in operation S103, at least one of the measured state of the image forming apparatus 100 and the selected CMS profile is displayed. The state of the image forming apparatus 100 may be displayed through the user interface 31 in FIG. 3 of the printer driver of the image forming apparatus 100.

As a selective operation, the previously measured state of the image forming apparatus 100 may be changed depending on an input of the user (operation S104). Although the CMS profile is automatically selected to correspond to the printing environment, it may be necessary to arbitrarily adjust the printing quality depending on a preference or an intention of the user. In this case, the state of the image forming apparatus

TABLE 1

| classification | outer ADC value | outer temperature °C. | inner ADC value | inner temperature °C. | CMS profile |
|---|---|---|---|---|---|
| 1 | 197-147 | 0° C.-18° C. | 185-152 | 0° C.-15° C. | low temperature (L/L): cold |
| 2 | 146-107 | 19° C.-32° C. | 151-131 | 16° C.-25° C. | Normal temperature (N/N): normal |
| 3 | 106-51 | 33° C.-60° C. | 129-64 | 26° C.-60° C. | High temperature (H/H): hot |

100 may be displayed to be changeable on the user interface (referring to 32 in FIG. 3). If the previously measured state of the image forming apparatus 100 is changed by the user, the CMS profile corresponding to the changed state of the image forming apparatus 100 may be newly selected.

Alternatively, the operation S103 may be unnecessary. For example, the printing quality may be prevented from deteriorating due to an unintentional handling of the user when the CMS profile is automatically optimized to the printing environment. In this case, the user interface of the printer driver of the image forming apparatus 100 may be displayed as shown by 21 in FIG. 2 and 51 in FIG. 5.

In operation S105, the printing data of the document is generated based on the CMS profile selected in the operation S102. For example, in operation S105, a process for compensating an original printing data of the document depending on the selected CMS profile may be performed.

Then, as selective operations, in operation S106, the generated printing data is transmitted from the host apparatus 200 to the image forming apparatus 100, and in operation S107, an image is formed on a record medium based on the transmitted printing data.

Aspects of the present invention may be applied to a configuration in which the image forming apparatus 100 and the host apparatus 200 are integrated to be a single image forming device (not shown) as well as a configuration in which the image forming apparatus 100 and the host apparatus 200 are separately provided as described above. In this case, the image forming device may further include a partial configuration of the host apparatus 200 for selecting the CMS profile and generating the printing data corresponding thereto, in addition to the configuration of the image forming apparatus 100.

As described above, aspects of the present invention provide an image processing method, an image forming apparatus and a host apparatus thereof generating a printing data optimized to various printing environments, thereby improving printing quality.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image processing method, comprising:
   measuring a state of an image forming apparatus connected to a host apparatus to perform color and monochrome printing;
   selecting at least one of a plurality of color management system profiles based on the measured state of the image forming apparatus; and
   generating printing data of a document based on the selected color management system profile,
   wherein the state of the image forming apparatus comprises at least one of an inner temperature, an outer temperature, moisture, a use history of the image forming apparatus, a type of the document, and a type and a size of a printable medium.

2. The image processing method according to claim 1, wherein the measuring of the state of the image forming apparatus is initiated by the image forming apparatus or by the host apparatus.

3. The image processing method according to claim 1, wherein:
   the measuring of the state of the image forming apparatus is performed when a print command to print the document is issued, when a user interface with respect to the image forming apparatus is displayed, when the image forming apparatus is turned on, and/or when a power saving mode of the image forming apparatus is cancelled; or
   the measuring of the state of the image forming apparatus is performed periodically or randomly.

4. The image processing method according to claim 1, further comprising displaying the measured state of the image forming apparatus and/or the selected color management system profile.

5. The image processing method according to claim 4, wherein the displaying is selectively performed based on whether the measuring of the state of the image forming apparatus is initiated by the image forming apparatus or by the host apparatus.

6. The image processing method according to claim 4, wherein the displaying comprises using a user interface of a printer driver corresponding to the image forming apparatus and/or a menu of an operation panel of the image forming apparatus.

7. The image processing method according to claim 1, wherein the measured state of the image forming apparatus is changeable by a user.

8. The image processing method according to claim 1, wherein the type of the document comprises at least one of monochrome text, monochrome graphic, a graphic, a photo, and text.

9. The image processing method according to claim 8, wherein one of a 1-dimension and a 3-dimension is applied depending on the type of the document.

10. The image processing method according to claim 1, wherein the color management system profile is stored in at least one of the image forming apparatus, the host apparatus, and an external storing apparatus connected to one of the image forming apparatus and the host apparatus.

11. The image processing method according to claim 10, wherein the external storing apparatus comprises at least one of a universal serial bus memory and a server connected via a network.

12. A host apparatus of an image forming apparatus which performs color and monochrome printing, the host apparatus comprising:
   a communicating unit to communicate with the image forming apparatus;
   an image processing unit to generate printing data of a document to be printed by the image forming apparatus; and
   a control unit to select at least one of a plurality of color management system profiles based on a state of the image forming apparatus, and to control the image processing unit to generate the printing data of the document based on the selected at least one color management system profile,
   wherein the state of the image forming apparatus comprises at least one of an inner temperature, an outer temperature, moisture, a use history of the image forming apparatus, a type of the document, and a type and a size of a printable medium.

13. The host apparatus of the image forming apparatus according to claim 12, wherein one of the image forming apparatus and the host apparatus initiates a command to measure the state of the image forming apparatus.

14. The host apparatus of the image forming apparatus according to claim 12, wherein:
   the state of the image forming apparatus is measured when a printing command of the document is issued, when a user interface with respect to the image forming apparatus is displayed, when the image forming apparatus is turned on; or when a power saving mode of the image forming apparatus is cancelled, or is measured periodically or randomly.

15. The host apparatus of the image forming apparatus according to claim 12, further comprising a display unit,
wherein the control unit controls the display unit to display at least one of the state of the image forming apparatus and the selected color management system profile.

16. The host apparatus of the image forming apparatus according to claim 15, wherein the control unit controls the display unit to display selectively according to whether the measuring the state of the image forming apparatus is initiated by the image forming apparatus or by the host apparatus.

17. The host apparatus of the image forming apparatus according to claim 15, wherein the control unit uses at least one of a user interface of a printer driver corresponding to the image forming apparatus, and a menu of an operation panel of the image forming apparatus.

18. The host apparatus of the image forming apparatus according to claim 12, wherein the state of the image forming apparatus is changeable by a user.

19. The host apparatus of the image forming apparatus according to claim 12, wherein the color management system profile is stored in at least one of the image forming apparatus, the host apparatus, and an external storing apparatus.

20. An image forming apparatus which performs color and monochrome printing, the image forming apparatus comprising:
an image processing unit to generate printing data of a document;
an image forming unit to perform printing based on the printing data;
a state measuring unit to measure a state of the image forming apparatus; and
a control unit to select at least one of a plurality of color management system profiles based on the measured state of the image forming apparatus, and to control the image processing unit to generate the printing data based on the selected color management system profile,
wherein the measured state of the image forming apparatus comprises at least one of an inner temperature, an outer temperature, moisture, a use history of the image forming apparatus, a type of the document, and a type and a size of a printable medium.

21. A method of improving print quality, the method comprising:
selecting one of a plurality of color management system (CMS) profiles based on a state of an image forming apparatus;
controlling the image forming apparatus to print an image onto a printable medium based on the selected CMS profile;
measuring a state of the image forming apparatus; and
creating a CMS profile based on the measured state,
wherein the measured state of the image forming apparatus comprises at least one of an inner temperature, an outer temperature, moisture, a use history of the image forming apparatus, a type of the document, and a type and a size of a printable medium.

22. An image forming apparatus comprising:
a printer communicating unit to receive print data corresponding to an image to be printed;
a printer control unit to select one of a plurality of color management system (CMS) profiles corresponding to a state of the image forming apparatus;
an image forming unit to form an image onto a printable medium based on the print data and the selected CMS profile; and
a storage unit to store the plurality of CMS profiles,
wherein the state of the image forming apparatus comprises at least one of an inner temperature, an outer temperature, moisture, a use history of the image forming apparatus, a type of the document, and a type and a size of a printable medium.

* * * * *